United States Patent [19]
McNerney et al.

[11] Patent Number: 5,999,208
[45] Date of Patent: Dec. 7, 1999

[54] SYSTEM FOR IMPLEMENTING MULTIPLE SIMULTANEOUS MEETINGS IN A VIRTUAL REALITY MIXED MEDIA MEETING ROOM

[75] Inventors: Michelle McNerney, Freehold, N.J.; Rachel Y. Yang, Superior, Colo.

[73] Assignee: Lucent Technologies Inc., Murray Hill, N.J.

[21] Appl. No.: 09/115,819

[22] Filed: Jul. 15, 1998

[51] Int. Cl.$^6$ ........................................................ H04N 7/15
[52] U.S. Cl. ................................. 348/15; 348/14; 345/330
[58] Field of Search ........................ 348/14, 15; 345/330; H04N 7/15

[56] References Cited

U.S. PATENT DOCUMENTS

| | | | |
|---|---|---|---|
| 4,516,156 | 5/1985 | Fabris et al. | 348/15 |
| 5,627,978 | 5/1997 | Altom et al. | 345/330 |
| 5,815,080 | 9/1998 | Taguchi et al. | 340/635 |
| 5,880,731 | 3/1999 | Liles et al. | 345/349 |

FOREIGN PATENT DOCUMENTS

0574138A1  12/1993  European Pat. Off. ......... H04N 7/15

*Primary Examiner*—Curtis A. Kuntz
*Assistant Examiner*—Melur Ramakrishnaiah

[57] ABSTRACT

The virtual reality mixed media meeting room functions to provide the user with a visually familiar conference format and conference controls that are intuitive to operate. In particular, the system presents the conference participants with a visual representation of the various communication equipment that is typically present in a conference room and that is available in the virtual reality mixed media conference. The operation of this communication equipment is analogous to that of the physical communication equipment, so the conference participant needs no training to actively and efficiently participate in the virtual reality mixed media conference. The various aspects of the virtual reality conference are presented in a rendering that emulates the physical appearance and presence of the physical participants and communication devices that would be present in a traditional conference room. The user interacts with the virtual reality mixed media meeting room via the graphical user interface in a point and click manner, thereby eliminating the need for the conference participant to be aware of specific controls or keyboard entries required in previous systems to control their participation in the conference. Furthermore, switching among the plurality of concurrently active virtual reality mixed media conferences to participate in one of these conferences is accomplished by a visually familiar mechanism, such as panning or traveling through a hallway that interconnects the various virtual reality mixed media "conference rooms." In addition to being able to move among a plurality of conferences, the conference participants in any selected conference can share applications and jointly participate in the modification of presentations and displays.

26 Claims, 6 Drawing Sheets

SYSTEM FOR IMPLEMENTING MULTIPLE SIMULTANEOUS MEETINGS IN A VIRTUAL REALITY MIXED MEDIA MEETING ROOM

FIELD OF THE INVENTION

This invention relates to virtual reality meeting rooms and in particular to a system that supports multiple simultaneous meetings that comprise mixed media, using feature activation that is based upon a visually familiar paradigm.

PROBLEM

It is a problem in the field of telecommunication conferences to provide the characteristics of face-to-face meetings via a simulated environment and to support multiple concurrent meetings. Existing telecommunication conference systems permit conference participants at separate locations to communicate in a limited fashion with one another in multiple media, such as voice, video, and data.

Typically, these telecommunication conference systems comprise a distributed architecture that involves a plurality of complicated and expensive computer workstations that are connected together by a single mode communication facility that functions simply as a data transport mechanism for whatever must be communicated among conference participants' workstations. Each workstation must support a significant amount of media data processing capabilities, including conference bridge and communication synchronization circuits to effect the conference. The necessity for these circuits increases the cost of conferences and renders these systems uneconomical for many users. In addition, the telecommunication conference systems require a selected conference initiating workstation to remain active for the entirety of the telecommunication conference systems conference. Furthermore, it is difficult for conference participants to leave and then rejoin the conference. In the instance where the workstations are not uniform in implementation or the data transport mechanisms differ, the management of the conference represents a significant management commitment.

Alternatively, these telecommunication conference systems comprise a centralized architecture that involves media bridges that are located in the telecommunications network. However, these centralized systems have a difficult time serving conference participants that have differing media capabilities and conference access mechanisms. Furthermore, it is difficult for conference participants to leave and then rejoin the conference. In the instance where the workstations are not uniform in implementation or the data transport mechanisms differ, the management of the conference represents a significant management commitment.

One improvement in telecommunication conference systems is a telecommunications network that provides convenient and transparent telecommunications services in a manner analogous to that used to establish ordinary voice telephone calls. In particular, the telephone network comprises virtual meeting services equipment (comprising a combination of hardware and software) located in the network and connected to a plurality of ports to provide users with access to a mixed media conference. The electronic circuit configuration may be a data structure that represents a persistent virtual meeting room in the network. Conference participants may communicate with other conference participants in any media and may join the conference or depart from the conference at will, without disrupting the conference or requiring a selected conference initiating workstation to remain active for the entirety of the telecommunication conference systems conference.

However, it still remains a problem in all of these systems to provide the conference services in a manner that enables the conference participant to access and use the conference services in a way that is intuitive to the participant and corresponds to the real world. Since conference participants are not likely to use the conference facilities on a frequent basis, the need to follow complex procedures to implement and participate in a conference leads to customer frustration and incorrect operation of the conference facilities.

SOLUTION

The above described problems are solved and a technical advance is achieved by the present system for implementing multiple simultaneous meetings in a virtual reality mixed media meeting room that functions to provide the user with a visually familiar conference format and conference controls that are intuitive to operate. In particular, the system for implementing multiple simultaneous meetings in a virtual reality mixed media meeting room presents the conference participants with a visual representation of the various communication equipment that is typically present in a conference room and that is available in the virtual reality mixed media conference. The operation of this communication equipment is analogous to that of the physical communication equipment, so the conference participant needs no training to actively and efficiently participate in the virtual reality mixed media conference. Furthermore, switching among the plurality of concurrently active virtual reality mixed media conferences to participate in one of these conferences is accomplished by a visually familiar mechanism, such as panning or traveling through a hallway that interconnects the various virtual reality mixed media "conference rooms." In addition to being able to move among a plurality of conferences, the conference participants in any selected conference can share applications and jointly participate in the modification of presentations and displays.

The communication equipment provided by the system for implementing multiple simultaneous meetings in a virtual reality mixed media meeting room include, but are not limited to: file drawers, mail box, video tape player, whiteboard projector screen, and the like. In addition, the conference participants are visually represented as seated around a conference table, preferably using a video rendition of their image. The list of conference participants and their telephone numbers are presented, and in the case of multiple simultaneous conferences, by conference room. The user can navigate between the various conferences by either panning the view from room to room or by departing through the conference room exit door and traversing a hallway to another conference room.

The various aspects of the virtual reality conference are presented in a rendering that emulates the physical appearance and presence of the physical participants and communication devices that would be present in a traditional conference room. The user interacts with the virtual reality mixed media meeting room via the graphical user interface in a point and click manner, thereby eliminating the need for the conference participant to be aware of specific controls or keyboard entries required in previous systems to control their participation in the conference.

DETAILED DESCRIPTION

Communication Network Architecture

Figure 1:
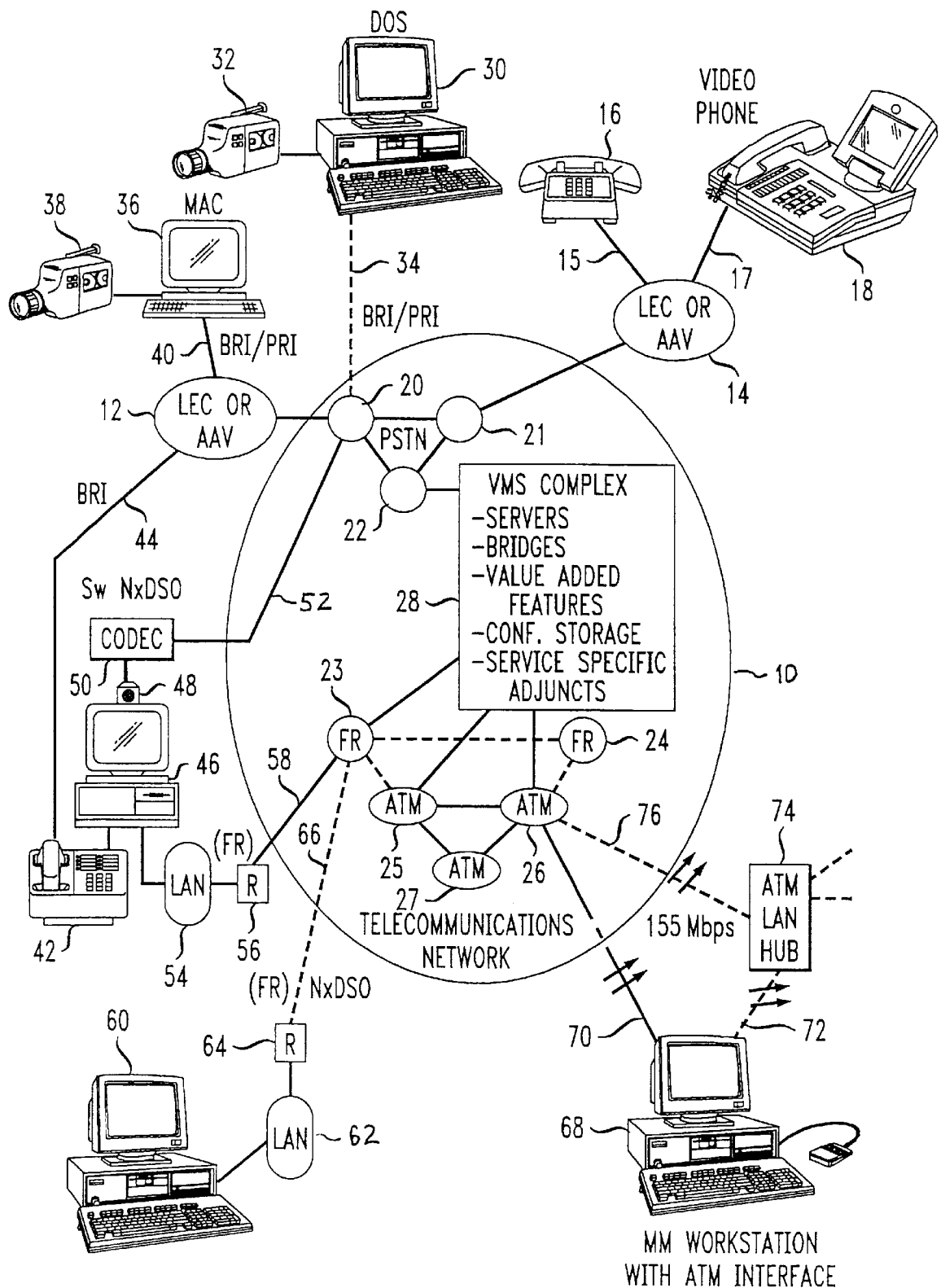
FIG. 1 illustrates in block diagram form an example of a mixed media telecommunications network used to implement the present system for implementing multiple simultaneous meetings in a virtual reality mixed media meeting room.

FIG. 1 illustrates in block diagram form an example of a mixed media telecommunications network used to implement the present system for implementing multiple simultaneous meetings In a virtual reality mixed media meeting room. The telecommunications network 10 illustrated in FIG. 1 comprises the public switched telephone network composed of a plurality of interconnected network nodes 20, 21, 22 each having a switching system. The network 10 also may contain one or more packet networks comprised of a plurality of interconnected frame relay nodes 23, 24 and an asynchronous transfer mode (ATM) network composed of interconnected ATM nodes 25–27. The network 10 also contains a centralized complex 28 that effects a virtual meeting service (VMS), connected to the public switched telephone network, the frame relay network and the asynchronous transfer mode network. The virtual meeting system 28 contains or accesses a group of media bridges that provide the physical connections between conference participants. The operation of the media bridges are coordinated by respective media servers. The example of FIG. 1 shows a voice telephone 16 connected to the local network 14 via a subscriber line 15 and a video telephone 18 connected to the local network 14 via subscriber line 17. MSDOS computer 30 and its associated camera 32 are directly connected to node 20 in network 10 via integrated access line 34. FIG. 1 also shows a Macintosh type computer 36 and its associated camera 38 connected to local network 12 via integrated access line 40. Mixed media workstation 46 able to communicate in audio, video and data has non-integrated access to network 10. The workstation comprises voice telephone 42 connected to local network 12 by means of line 44 and connected to workstation 46. The workstation is associated a video camera 48, the output of which is sent to codec 50 and whose output is directed to node 20 by means of line 52. Data from workstation 46 is directed to a local area network 54 and then to a router 56 and thence to node 23 in the frame relay network. FIG. 1 also shows a computer 60 whose data output is directed to LAN 62, router 64, then to frame relay node 23 by means of line 66. A mixed media workstation 68 communicates in audio, video, and data with the asynchronous terminal mode network.

Virtual Meeting Services Circuit

Figure 2:
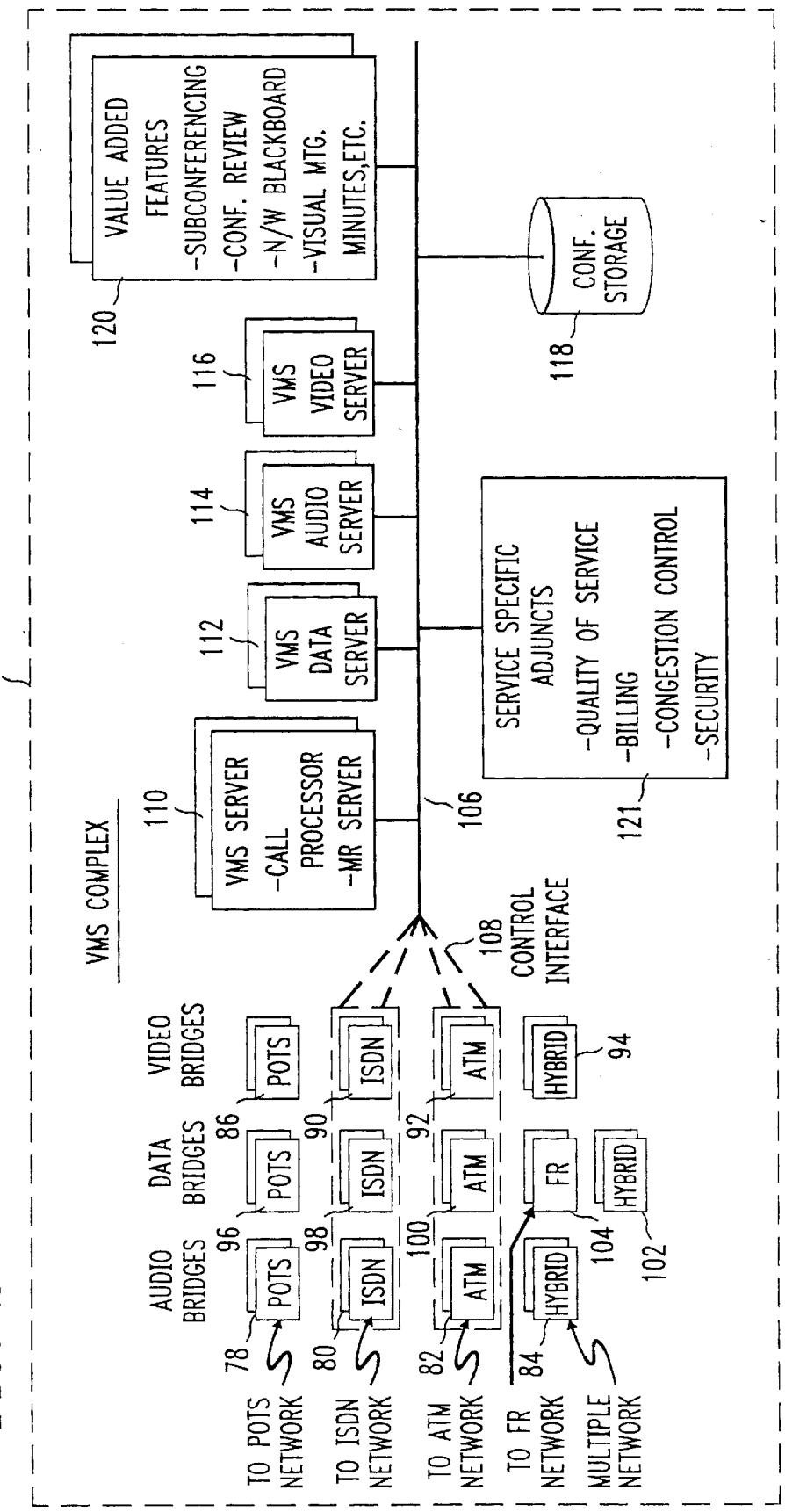
FIG. 2 illustrates in block diagram form the details of the virtual meeting services circuit in which the present system for implementing multiple simultaneous meetings in a virtual reality mixed media meeting room is implemented.

The telecommunications network 10 of FIG. 1 is able to create connections in any preselected media between any of the diverse communications devices possessed by network subscribers. The connections in predetermined media are facilitated by the creation of controllably persistent virtual meeting rooms in the network by the virtual meeting services circuit. FIG. 2 illustrates details of the virtual meeting services circuit 28 that is shown in FIG. 1. The virtual meeting services circuit 28 contains a number of signal bridging resources that are used to implement conference connections between a plurality of conference participants in one or more selected media. The virtual meeting services circuit 28 includes audio bridges, data bridges, and video bridges. Each of these bridges is capable of receiving media input from the conference participants and directing selected ones of these inputs back to selected conference participants. For each type of media, there are a number of bridges, corresponding to the network presence of the conference participants. For example, there are POTS bridges 78, 96, 86 that exchange POTS signals with conference participants who are served by the POTS network, while ISDN bridges 80, 98, 90 serve conference participants who are connected to an ISDN network presence and ATM bridges 82, 100, 92 serve conference participants who are connected to an ATM network presence. The group of bridges also includes hybrid bridges 84, 94, 102 that are capable of converting between various signal types to thereby interconnect conference participants who are using dissimilar equipment. The virtual meeting services circuit 28 also includes VMS server 110 that contains a call processor to handle the telephone calls that are made to the virtual meeting services circuit 28 and a meeting room server to coordinate control of the equipment that serves a conference connection. In addition, data server 112, audio server 114 and video server 116 are connected to bus 106 and function to serve the particular media type for the conference connections. A conference storage device 118 is provided to store data for use in the conference connections, such as: audio and video recordings of predetermined parts of the mixed media conferences, data generated in the course of executing computer programs shared by conference participants, mixed media conference meeting minutes, user's files, shared whiteboard information, and the like. The virtual meeting services circuit 28 may also include value added circuitry 120 that provide conference features, such as the ability to divide off a subgroup of conference participants into a private caucus, conference participant activated hold, conference review, electronic whiteboard, meeting minutes, video rendering of conference images, and the like. Finally, the virtual meeting services circuit 28 includes special service circuits 121 that address conference management, such as: quality of service, billing, congestion control and security.

Existing Teleconference Presentation

Figure 3:
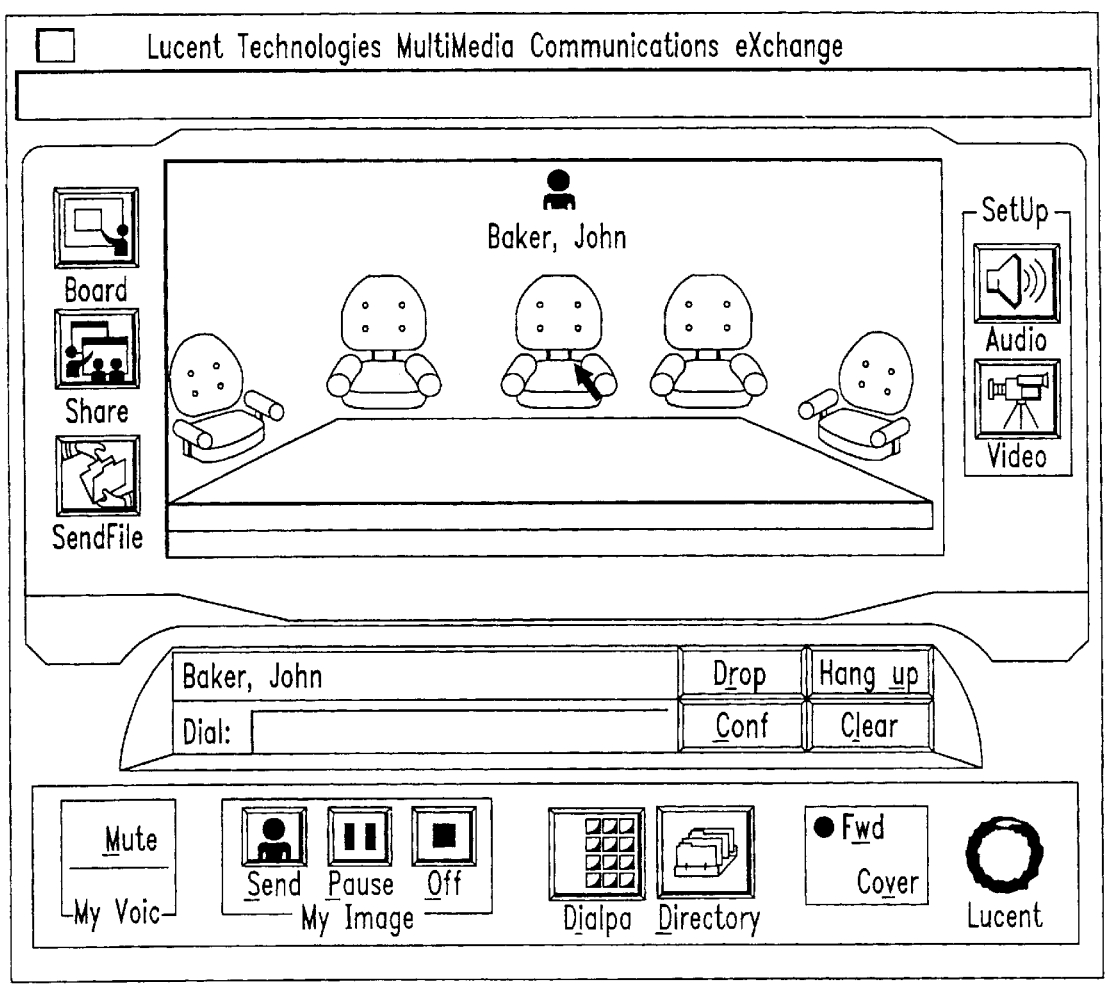
FIG. 3 illustrates a screen shot of a typical existing virtual meeting room.

FIG. 3 illustrates a screen shot of a typical existing virtual meeting room. Existing virtual meeting room views use a considerable amount of screen space but the information density is low. The chairs in the meeting room have icons placed above the chairs to indicate the identity of the conference participant and what media they are capable of communicating. The chairs provide limited amount of data and occupy a significant amount space. The conference table or a whiteboard icon can be placed thereon. Thus, the two elements of data: conference participant identity and media mode, occupy a large amount of space in the display, yet do not provide the conference participant with any indication of how they can control their participation in the conference. The controls required to control conference operation are represented as icons or menu items or require the conference participant to enter predetermined keystrokes. The controls are dispersed about the display and do not present a user friendly interface. In addition, the access to other media, such as text, graphics, video and the like are not clearly presented and typically displace the conference view. Furthermore, only one conference at a time can be processed by this system and conference participants are therefore required to schedule their conferences at non-overlapping times.

Virtual Reality Mixed Media Meeting Room

Figure 4:
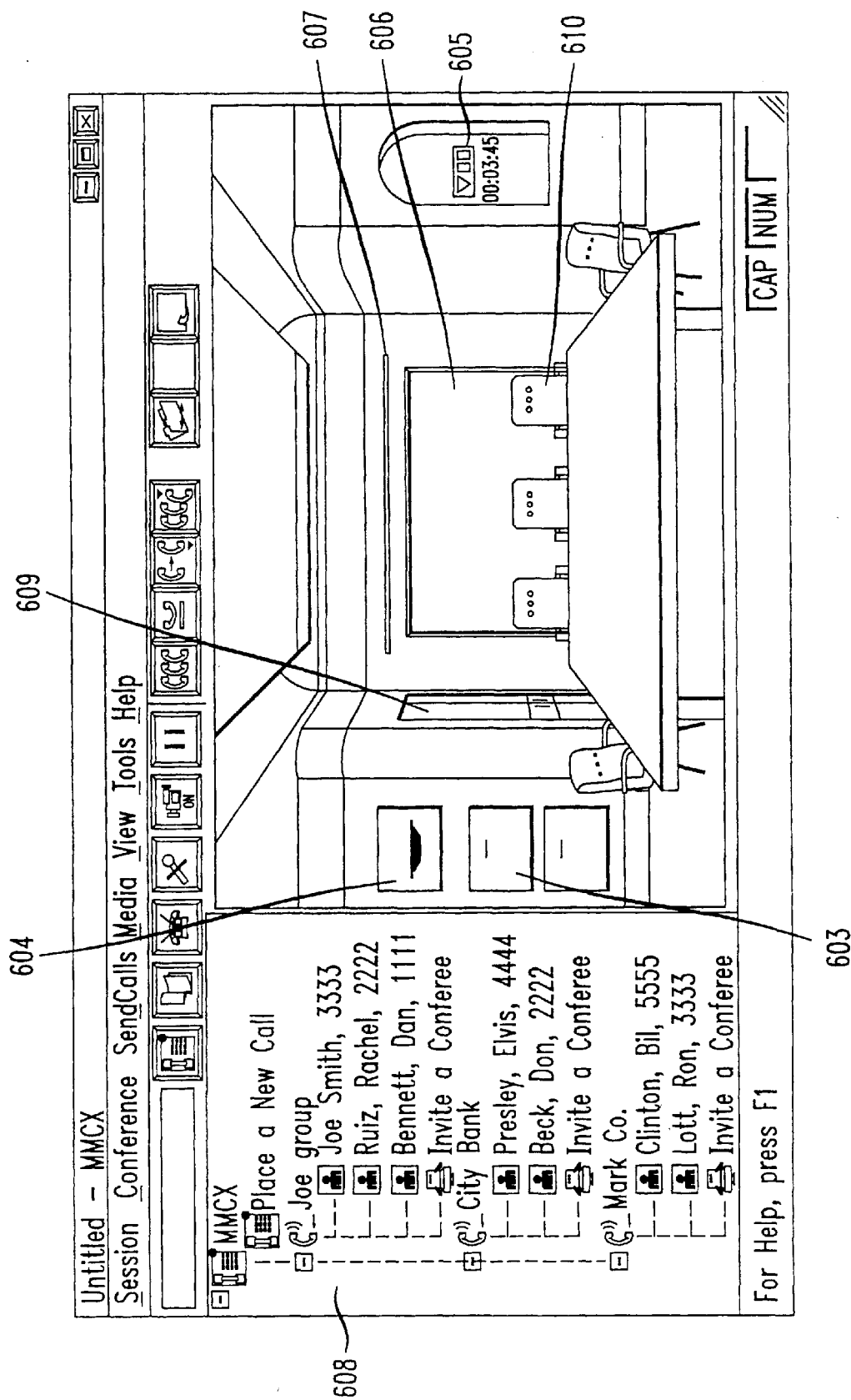
FIG. 4 illustrates a screen shot of the virtual reality meeting room generated by the present system for implementing multiple simultaneous meetings in a virtual reality mixed media meeting room.
Figure 5C:
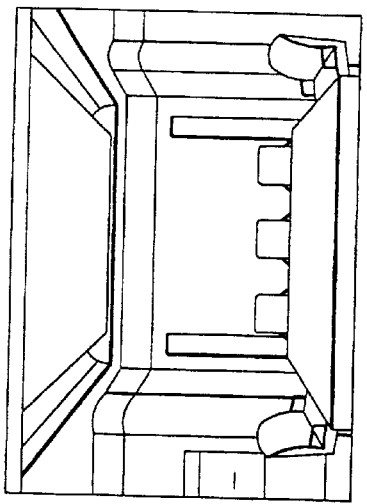
FIGS. 5A–5E illustrate a sequence of displays that illustrate the view panning capability of the system for implementing multiple simultaneous meetings in a virtual reality mixed media meeting room to enable the user to move from one conference to another.
Figure 5B:
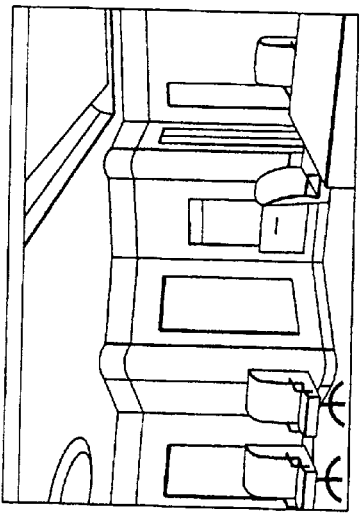
Figure 5A:
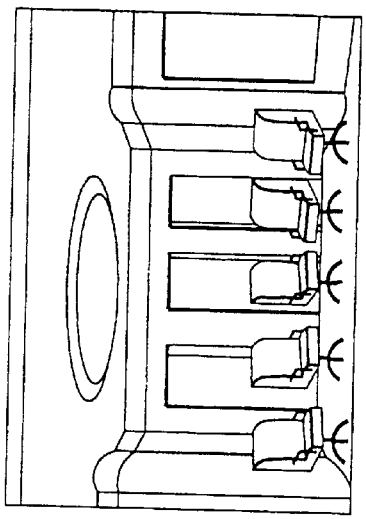
Figure 5E:
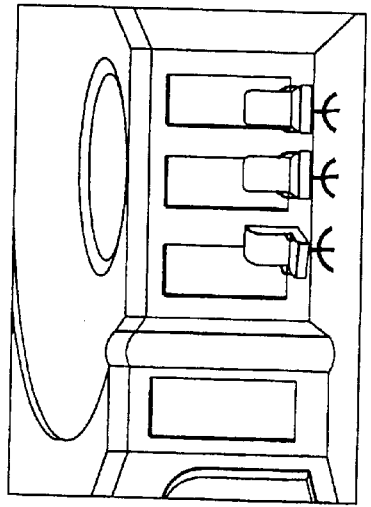
Figure 5D:
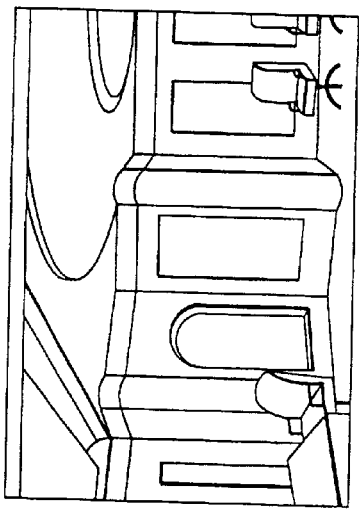

FIG. 4 illustrates a screen shot of the virtual reality meeting room generated by the present system for implementing multiple simultaneous meetings in a virtual reality mixed media meeting room. The virtual reality meeting room provides a user-friendly access to the mixed media teleconference services and enables the participant to simultaneously participate in multiple meetings. The virtual reality meeting room operates in a realistic mode and provides the participant with the tools to activate mixed media conference services and to identify both the speakers and their communication properties. The virtual reality meeting room presently comprises a plurality of meeting rooms, three of which are shown in FIGS. 5A–5E. Display and scanning of the plurality of meeting rooms is accomplished by the software taking a snapshot of each room at predetermined intervals. A plurality of snapshots of each room are used to present the impression that there is scanning between the three rooms. In particular, 30 snapshots are used to represent three rooms, with the ten snapshots of each room being presented in sequence to emulate the actual scanning across the rooms. FIGS. 5A–5E illustrate five of these snapshots to illustrate the panning effect that is provided to the user.

Figure 6:
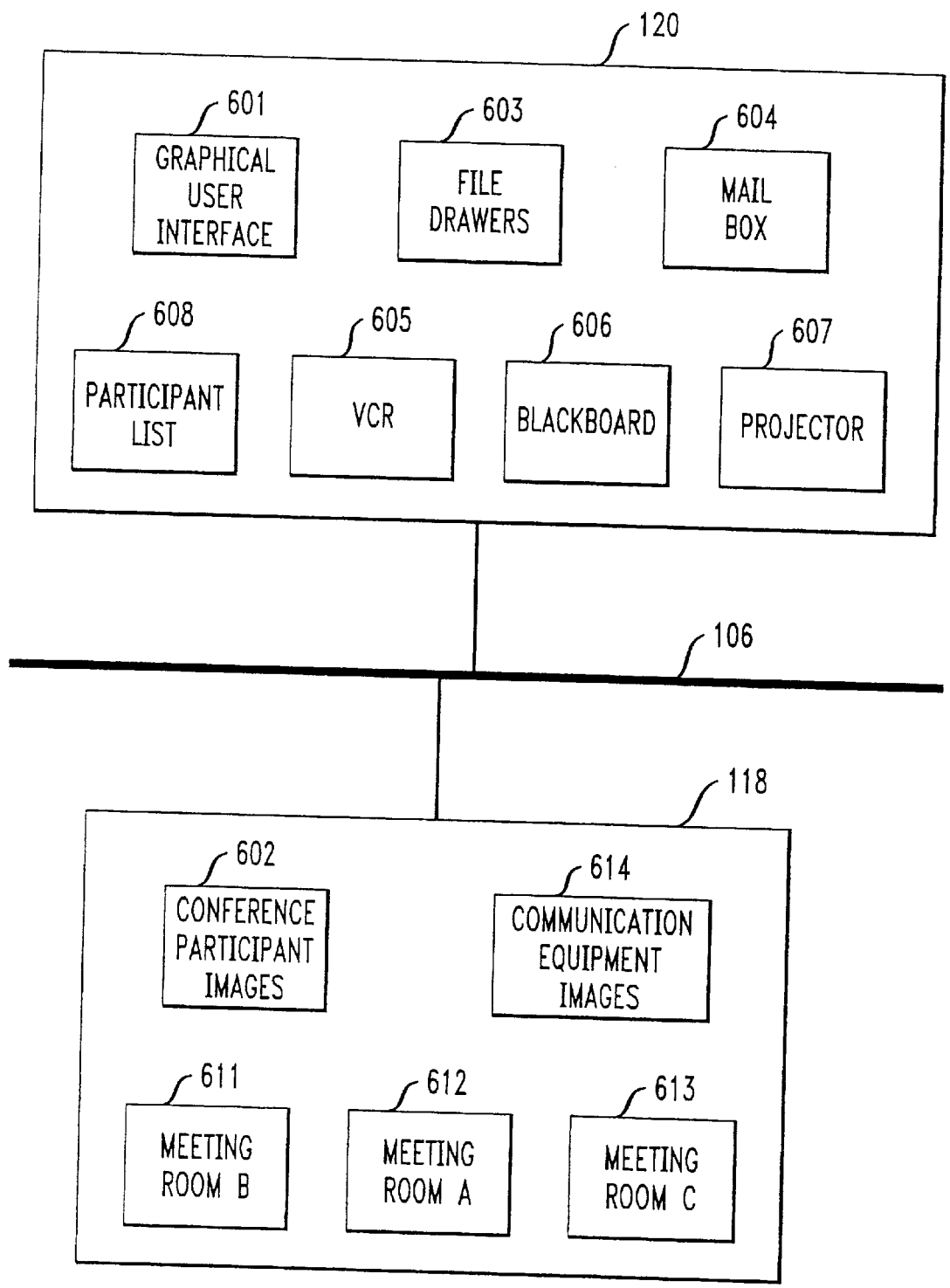
FIG. 6 illustrates in block diagram form additional details of the present system for implementing multiple simultaneous meetings in a virtual reality mixed media meeting room.

FIG. 6 illustrates in block diagram form additional details of the present system for implementing multiple simultaneous meetings in a virtual reality mixed media meeting room. In particular, the operating software for the presentation mode comprises a graphical user interface 601 that resides in the value added features element 120 of the VMS complex 28. The graphical user interface 601 operates to provide a more realistic virtual meeting room by accessing a plurality of visual representations from the conference storage 118 and managing the display of these visual representations on the users display at their terminal device. The rendering of the resultant image enables the conference participants to interact on a visually familiar basis with the virtual reality meeting room and activate the conference features in a point and click manner, which actions are translated by the graphical user interface 601 into conference control actions. For example, a plurality of meeting room formats 611–613 are stored in conference storage memory 118 and the conference originator selects one format 611 for the baseline display. The graphical user interface 601 conference participants are identified as located in a selected chair 610 and an image is displayed in each chair. The visual representation of a conference participant can be created by storing and downloading a picture of the individual from a conference participant memory 602. Alternatively, the image of the conference participant can be received as part of the transmission from their terminal. If the terminal is equipped with a camera, the conference participant can have their image transmitted to the conference as a screen shot, to be used as their representation in the conference. In addition, the camera can be used to transmit images, such as viewgraphs or photographs that are projected on a screen at the conference participant's terminal.

The communication equipment provided by the system for implementing multiple simultaneous meetings in a virtual reality mixed media meeting room include, but are not limited to: file drawers 603, mail box 604, video tape player 605, blackboard 606, projector screen 607, and the like. In addition, the list of conference participants 608 and their telephone numbers is maintained and presented, and in the case of multiple simultaneous conferences, on a conference room basis. The user can navigate between the various conferences by either panning the view from room to room or by departing through the conference room exit door 609 and traversing a hallway to another conference room. The visual images of these functions are stored in conference storage memory 118 and the associated functionality is defined in subroutines stored in value added features 120. The graphical user interface 601 links the images and functionality and provides the virtual reality meeting room functionality.

The various aspects of the virtual reality conference are presented by graphical user interface 601 in a rendering that emulates the physical appearance and presence of the physical participants and communication devices that would be present in a traditional conference room. The user interacts with the virtual reality mixed media meeting room via the graphical user interface 601 in a point and click manner, thereby eliminating the need for the conference participant to be aware of specific controls or keyboard entries required in previous systems to control their participation in the conference. For example, when a conference participant wishes to activate an application to share with the other conferees or activate the application to generate a presentation to share with the other conferees, the participant points to the file drawer 603 displayed on the conference room image 611 and clicks the mouse to indicate a selection. The selection is transmitted in well known fashion from the participant's terminal device to the VMS server 110, which forwards this data to the graphical user interface 601 for this conference. The graphical user interface 601 responds to the participant's input by accessing a visual image stored in conference storage memory 118 in the file drawers 603 file, which image is indicative of an open file drawer, with its contents. The participant can then remove a "file" (application) from the file drawer and activate the retrieved application (such as Power Point, or a CAD tool) to present a display to the other conferees. This is accomplished by the participant using the drag and drop capability to move the retrieved application to the table image on the display and depositing the file thereon. The participant's terminal device transmits data indicative of the cursor movement and mouse clicks to the graphical user interface 601, which responds to these inputs by updating the display presented to the conferees and the participant to demonstrate the participant's actions. In particular, the images are retrieved from the conference storage memory 118 by the graphical user interface 601 and used to update the display of the image presented to the conferees. In addition, the graphical user interface 601 activates the application function defined in the value added features 120 in response to the participant's input by electronically retrieving the identified application and making it available in a shared mode among the terminal devices associated with the other conferees.

Thus, the images and the associated media management functions are presented to the conferees via the graphical user interface 601 which functions to translate between the conferees point and click, drag and drop operations and the functionality defined in the various mixed media functions that are stored in the value added features 120 and the images stored in conference storage memory 118. By using this visually familiar paradigm, stored documents and tools are available at the conference table for each conference participant. Any user can sweep between active calls and all interaction takes place in a single graphical environment, as opposed to changing between a text and a graphical environments. The user can use the virtual meeting room for persistent and periodic meetings, where documents can be stored, agendas posted for the next meeting, and the like. In this regard, the virtual meeting room functions as a real meeting room. The conference participants can pick up where the last meeting ended, with all prior information discussed at the last meeting being readily available, since this is stored in conference storage memory 118. The conferees can pull down a whiteboard projection screen, open file drawers to retrieve electronic files, can place files in mailbox to send to the other conferees, can activate a VCR to share video information. The definition of the equipment and its operation is maintained in the value added features 120 while the visual rendering is stored in the conference storage memory 118, with the graphical user interface 601 performing the control of the conference operation via the translation between the conferees' inputs and the features defined in the system.

Summary

Thus, the virtual reality mixed media meeting room that functions to provide the user with a visually familiar conference format and conference controls that are intuitive to operate. In particular, the system for implementing multiple simultaneous meetings in a virtual reality mixed media meeting room presents the conference participants with a visual representation of the various communication equipment that is typically present in a conference room and that is available in the virtual reality mixed media conference. The operation of this communication equipment is analogous to that of the physical communication equipment, so the conference participant needs no training to actively and efficiently participate in the virtual reality mixed media conference. Furthermore, switching among the plurality of concurrently active virtual reality mixed media conferences to participate in one of these conferences is accomplished by a visually familiar mechanism, such as panning or traveling through a hallway that interconnects the various virtual reality mixed media "conference rooms." In addition to being able to move among a plurality of conferences, the conference participants in any selected conference can share applications and jointly participate in the modification of presentations and displays.

What is claimed:

1. A telecommunication system mixed media virtual reality conference interface for managing the participation of conferees, each equipped with a terminal device, in a mixed media conference, comprising:

means for storing a substantially visually accurate perspective view image of a conference room;

means for storing a plurality of visual images, each of which corresponds to a visually accurate representation of a physical appearance of a present state of a one of a plurality of pieces of communication equipment used in said conference room; and means for rendering a display that integrates said substantially visually accurate perspective view image of said conference room with those of said plurality of visual images that represent a presence, location in said conference room, and a present state of a plurality of communication equipment used in said conference room.

2. The telecommunication system mixed media virtual reality conference interface of claim 1 further comprising:

means for transmitting said rendered display to all of said conferees.

3. The telecommunication system mixed media virtual reality conference interface of claim 1 wherein said means for rendering comprises:

means, responsive to a one of said conferees selecting a one of said piece of communication equipment on a display presented at said one conferee's terminal device, for updating said rendered display to reflect operation of said one piece of communication equipment corresponding to said selection.

4. The telecommunication system mixed media virtual reality conference interface of claim 3 wherein said means for rendering further comprises:

means, responsive to a one of said conferees selecting a one of said piece of communication equipment on a display presented at said one conferee's terminal device, for activating a communication functionality corresponding to said one conferee's selection of said one of said piece of communication equipment.

5. The telecommunication system mixed media virtual reality conference interface of claim 4 wherein said means for rendering further comprises:

means for managing a plurality of concurrently active mixed media conferences, each of which serves a plurality of conferees; and means for enabling a conference participant to switch among said plurality of concurrently active mixed media conferences.

6. The telecommunication system mixed media virtual reality conference interface of claim 5 wherein said means for enabling comprises:

means, responsive to control signals input by a conferee indicative of movement within said display of said conference room, for transferring participation of said conferee from a first to another of said plurality of concurrently active mixed media conferences.

7. A method operational in a telecommunication system mixed media virtual reality conference interface for managing the participation of conferees, each equipped with a terminal device, in a mixed media conference, comprising the steps of:

storing in a memory a substantially visually accurate perspective view image of a conference room;

storing in a memory a plurality of visual images, each of which corresponds to a visually accurate representation of a physical appearance of a present state of a one of a plurality of pieces of communication equipment used in said conference room; and rendering a display that integrates said substantially visually accurate perspective view image of said conference room with those of said plurality of visual images that represent a presence, location in said conference room, and a present state of a plurality of communication equipment used in said conference room.

8. The method of operating a telecommunication system mixed media virtual reality conference interface of claim 7 further comprising the step of:

transmitting said rendered display to all of said conferees.

9. The method of operating a telecommunication system mixed media virtual reality conference interface of claim 7 wherein said step of rendering comprises:

updating, in response to a one of said conferees selecting a one of said piece of communication equipment on a display presented at said one conferee's terminal device, said rendered display to reflect operation of said one piece of communication equipment corresponding to said selection.

10. The method of operating a telecommunication system mixed media virtual reality conference interface of claim 9 wherein said step of rendering further comprises:

activating, in response to a one of said conferees selecting a one of said piece of communication equipment on a display presented at said one conferee's terminal device, a communication functionality corresponding to said one conferee's selection of said one of said piece of communication equipment.

11. The method of operating a telecommunication system mixed media virtual reality conference interface of claim 10 wherein said step of rendering further comprises:

managing a plurality of concurrently active mixed media conferences, each of which serves a plurality of conferees; and enabling a conference participant to switch among said plurality of concurrently active mixed media conferences.

12. The method of operating a telecommunication system mixed media virtual reality conference interface of claim 11 wherein said step of enabling comprises:

transferring, in response to control signals input by a conferee indicative of movement within said display of said conference room, participation of said conferee from a first to another of said plurality of concurrently active mixed media conferences.

13. A telecommunication system mixed media virtual reality conference interface for managing the participation of a plurality of conferees, each equipped with a terminal device, in a plurality of mixed media conferences, comprising:

means for storing a substantially visually accurate perspective view image of a conference room for each of a plurality of concurrently active conferences;

means for storing a plurality of a substantially visually accurate perspective view images for each of said plurality of concurrently active conferences, each of which corresponds to a substantially visually accurate perspective view representation of a physical appearance of a present state of a one of a plurality of pieces of communication equipment used in an associated one of said plurality of concurrently active conferences;

means for enabling a conferee to select on a dynamic basis at least one of said plurality of concurrently active conferences in which to be a participant; and means for rendering a display that integrates a one of said stored images of said selected conference room with those of said plurality of visual images that represent a presence, location in said conference room of said conferee as well as a presence, location in said conference room, and a present state of a plurality of communication equipment used in said selected conference.

14. The telecommunication system mixed media virtual reality conference interface of claim 13 further comprising:

means for transmitting said rendered display to all of said conferees.

15. The telecommunication system mixed media virtual reality conference interface of claim 13 wherein said means for rendering comprises:

means, responsive to a one of said conferees selecting a one of a plurality of pieces of communication equipment used in said selected conference on a display presented at said one conferee's terminal device, for updating said rendered display to reflect operation of said one piece of communication equipment corresponding to said selection.

16. The telecommunication system mixed media virtual reality conference interface of claim 15 wherein said means for rendering further comprises:

means, responsive to a one of said conferees selecting a one of said piece of communication equipment on a display presented at said one conferee's terminal device, for activating a communication functionality corresponding to said one conferee's selection of said one of said piece of communication equipment.

17. The telecommunication system mixed media virtual reality conference interface of claim 16 wherein said means for enabling comprises:

means for managing a plurality of concurrently active mixed media conferences, each of which serves a plurality of conferees; and means, responsive to control signals input by a conferee indicative of movement within said display of said conference room, for transferring participation of said conferee from a first to another of said plurality of concurrently active mixed media conferences.

18. The telecommunication system mixed media virtual reality conference interface of claim 13 wherein said one conferee selects a set of said plurality of concurrently active conferences in which to be a participant, said system further comprising:

means for enabling said one conferee to switch among said set of said plurality of concurrently active conferences on a dynamic basis to actively participate in one of said set of said plurality of concurrently active conferences at a time.

19. The telecommunication system mixed media virtual reality conference interface of claim 18 wherein said means for enabling said one conferee to switch comprises:

means for storing an image of a conference room for each of a plurality of concurrently active conference; and means for providing said one conferee with a visually familiar paradigm to enable said one conferee to switch among said set of said plurality of concurrently active conferences on a dynamic basis, comprising a one of the displays comprising: a representation of at least one hallway that interconnects conference rooms corresponding to images of said set of said plurality of concurrently active conferences, panning among conference rooms corresponding to images of said set of said plurality of concurrently active conferences.

20. A method of operating a telecommunication system mixed media virtual reality conference interface for managing the participation of a plurality of conferees, each equipped with a terminal device, in a plurality of mixed media conferences, comprising the steps of:

storing in a memory a substantially visually accurate perspective view image of a conference room for each of a plurality of concurrently active conferences;

storing in a memory a plurality of visual images for each of said plurality of concurrently active conferences, each of which corresponds to a visually accurate representation of a physical appearance of a present state of a one of a plurality of pieces of communication equipment used in an associated one of said plurality of concurrently active conferences;

enabling a conferee to select on a dynamic basis at least one of said plurality of concurrently active conferences in which to be a participant; and rendering a display that integrates a one of said stored substantially visually accurate perspective view images of said selected conference room with those of said plurality of visual images that represent a presence, location in said conference room of said conferee as well as a presence, location in said conference room, and a present state of a plurality of communication equipment used in said selected conference.

21. The method of operating a telecommunication system mixed media virtual reality conference interface of claim 20 further comprising the step of:

transmitting said rendered display to all of said conferees.

22. The method of operating a telecommunication system mixed media virtual reality conference interface of claim 20 wherein said step of rendering comprises:

updating, in response to a one of said conferees selecting a one of a plurality of pieces of communication equipment used in said selected conference on a display presented at said one conferee's terminal device, said rendered display to reflect operation of said one piece of communication equipment corresponding to said selection.

23. The method of operating a telecommunication system mixed media virtual reality conference interface of claim 22 wherein said step of rendering further comprises:

activating, in response to a one of said conferees selecting a one of said piece of communication equipment on a display presented at said one conferee's terminal device, a communication functionality corresponding to said one conferee's selection of said one of said piece of communication equipment.

24. The method of operating a telecommunication system mixed media virtual reality conference interface of claim 23 wherein said step of enabling comprises:

managing a plurality of concurrently active mixed media conferences, each of which serves a plurality of conferees; and transferring, in response to control signals input by a conferee indicative of movement within said display of said conference room, participation of said conferee from a first to another of said plurality of concurrently active mixed media conferences.

25. The method for operating a telecommunication system mixed media virtual reality conference interface of claim 19 wherein said step of enabling comprises:

managing a plurality of concurrently active mixed media conferences, each of which serves a plurality of conferees; and transferring, in response to control signals input by a conferee indicative of movement within said display of said conference room, participation of said conferee from a first to another of said plurality of concurrently active mixed media conferences.

26. The method of operating a telecommunication system mixed media virtual reality conference interface of claim 25 wherein said step of enabling said one conferee to switch comprises:

storing in a memory an image of a conference room for each of a plurality of concurrently active conferences; and providing said one conferee with a visually familiar paradigm to enable said one conferee to switch among said set of said plurality of concurrently active conferences on a dynamic basis, comprising a one of the displays comprising: a representation of at least one hallway that interconnects conference rooms corresponding to images of said set of said plurality of concurrently active conferences, panning among conference rooms corresponding to images of said set of said plurality of concurrently active conferences.

* * * * *